United States Patent [19]

Bassick

[11] Patent Number: 5,322,245
[45] Date of Patent: Jun. 21, 1994

[54] INTEGRATED PILOT PROTECTIVE AND RESTRAINT SYSTEM

[75] Inventor: John W. Bassick, Paxton, Mass.

[73] Assignee: David Clark Company Incorporated, Worcester, Mass.

[21] Appl. No.: 984,220

[22] Filed: Nov. 30, 1992

Related U.S. Application Data

[62] Division of Ser. No. 874,973, Apr. 27, 1992, Pat. No. 5,208,514.

[51] Int. Cl.$^5$ ............................................ B64D 25/02
[52] U.S. Cl. ........................ 244/122 B; 244/122 AG; 2/6.1
[58] Field of Search ............ 244/122 AG, 122 B, 121, 244/122 R; 2/6; 297/216, 464, 465, 466, 468, 391, 486; 280/748, 801, 808

[56] References Cited

U.S. PATENT DOCUMENTS

| | | | |
|---|---|---|---|
| 3,239,843 | 3/1966 | Lobelle | ........................................ 2/6 |
| 3,271,797 | 9/1966 | Boyce | .............................. 244/122 B |
| 4,424,736 | 1/1984 | Byrne . | |
| 4,664,341 | 5/1987 | Cummings | .................... 244/122 AG |
| 5,007,893 | 4/1991 | Row . | |
| 5,039,035 | 8/1991 | Fitzpatrick . | |

FOREIGN PATENT DOCUMENTS

| | | | |
|---|---|---|---|
| 885803 | 9/1943 | France | .............................. 244/122 B |
| 656079 | 8/1951 | United Kingdom | ............ 244/122 B |

OTHER PUBLICATIONS

Wood, E. H., "Contributions of Aeromedical Research to Flight and Biomedical Science," *Aviation, Space, and Environmental Medicine*, Oct. 1986, pp. A13-A23.

Razdan, R. et al., "Eye Tracking for Man/Machine Interfaces," *Sensors*, Sep. 1988.
ISCAN® Automatic Video Tracking Systems 1989-1990 Catalogue, pp. 1-11.
ISCAN® RK-446M Miniature Automatic Video Tracking System promotional brochure, 1989.
ISCAN® Evil Eye TM Eye Slaved Target Acquisition System promotional brochure, 1989.
ISCAN® Headhunter TM Head & Eye Slaved Pointing System promotional brochure, 1990.
Deakin, R. S., "Military Aircrew Head Support System," American Institute of Aeronautics and Astronautics, ICAS Conference 1990, ICAS-90-5.1.3, pp. 162-167.
Nordwell, B. D., "New Helmet for Pilots to Combine Night Vison and Head-Up Display," *Aviation Week & Space Technology*, Nov. 11, 1991.

*Primary Examiner*—Galen L. Barefoot
*Attorney, Agent, or Firm*—Samuels, Gauthier & Stevens

[57] ABSTRACT

An integrated pilot protection and restraining system having a circular bearing structure configured to surround the neck of the wearer, and a non-conformal helmet which is detachably coupled to and rotatably supported by the bearing structure. An automatic helmet rotation system is provided for controlling rotation of the helmet in response to movements of the wearer's head in order to maintain the helmet in a predetermined position with respect to the wearer's head. The system further includes a restraining anchor disposed on a rear portion of the bearing structure at its non-rotating base proximate to the base of the wearer's neck. The restraining anchor is coupled to a retractable restraining device.

5 Claims, 3 Drawing Sheets

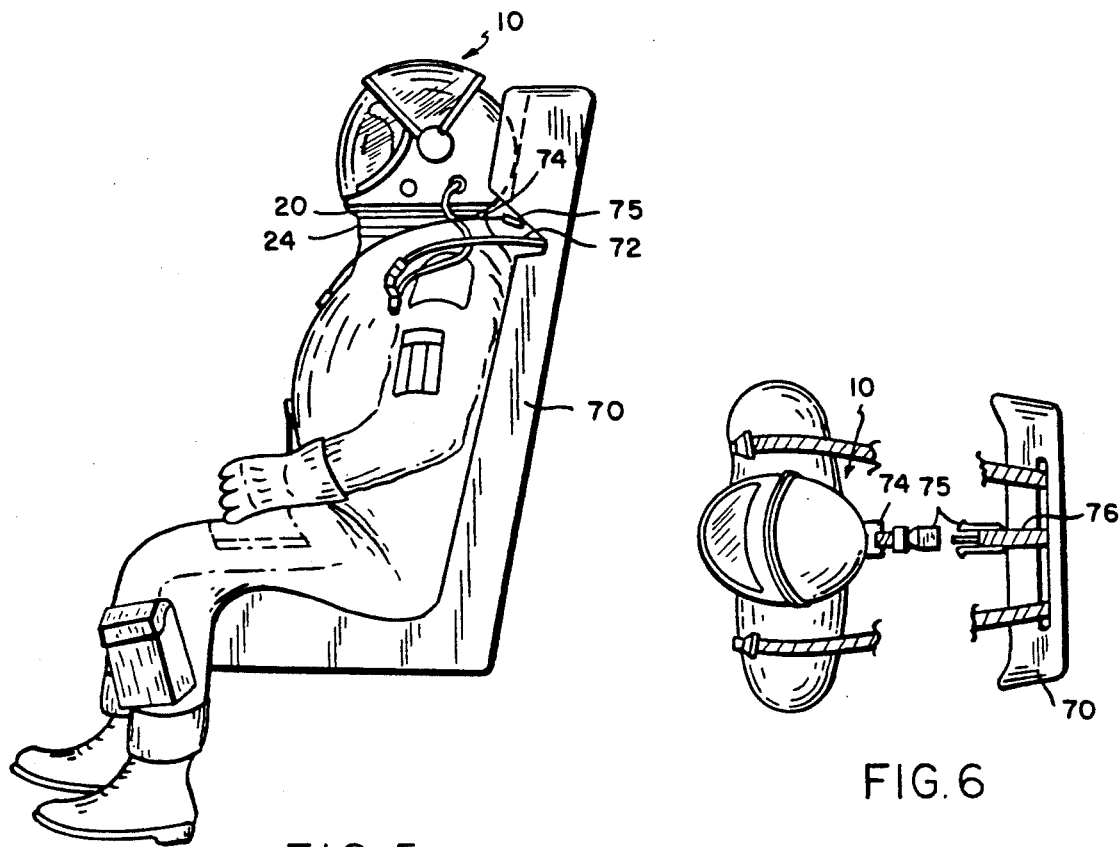
FIG. 5
FIG. 6
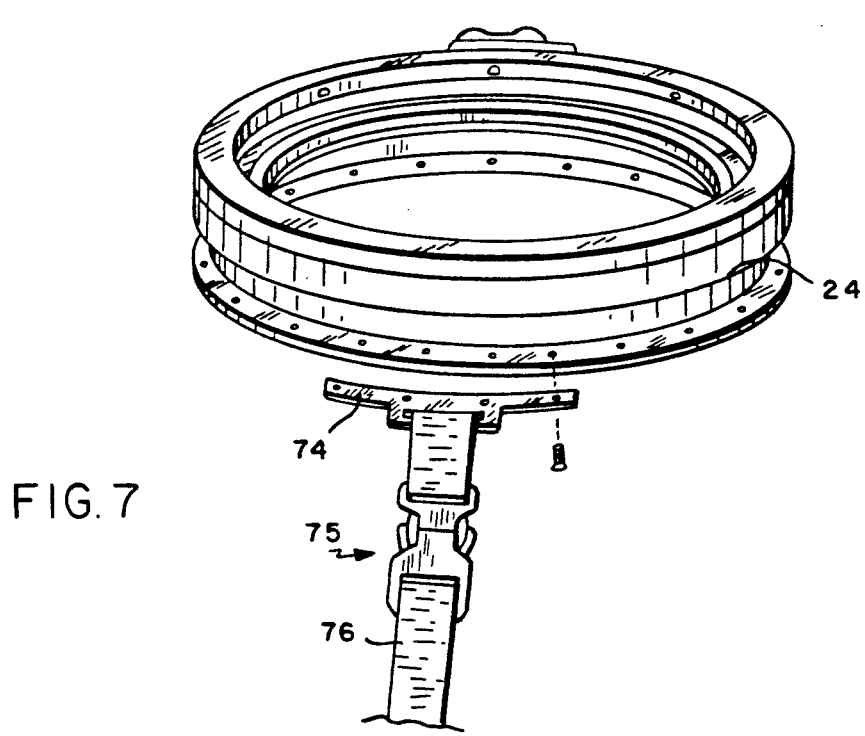
FIG. 7

INTEGRATED PILOT PROTECTIVE AND RESTRAINT SYSTEM

This is a divisional of copending application Ser. No. 07/874,973 filed on Apr. 27, 1992, now U.S. Pat. No. 5,208,514.

FIELD OF THE INVENTION

The invention relates to personal pilot protective systems, including helmets and body restraints, of the type worn by crew members of high performance fighter aircraft.

BACKGROUND OF THE INVENTION

With the recent advent of high performance fighter aircraft capable of sustained high acceleration (9+$G_Z$) and high altitude (+50,000 feet) flight, air crew protection performance has become a major limitation in aircraft operation. This is due to both current standard equipment design limitations and the lack of integration by design.

The provision of head protection and bodily restraint in conventional helmet configurations presents a major limitation in protection performance. With respect to state of the art helmet configurations, human factors such as comfort, stress and fatigue are performance limiting, principally because the entire head (eyes, ears, neck) is not protected. Additionally, in a high sustained (+$G_Z$) acceleration environment, the weight of the head born helmet configuration compounds rather than ameliorates air crew G-loading induced difficulties. For example, conventional helmet configurations which include oxygen-communication masks may weigh up to 7 pounds. While the weight of such headborne components are of limited concern during low acceleration flight of an aircraft, they may have drastic effects on the pilot during high acceleration of the aircraft. The high G-forces imposed on the pilot effectively multiply the weight of the helmet and, therefore, increase the head and neck stress of the pilot during attempted head movements. It is therefore highly desirable to provide a helmet which is not burdensome to the pilot's head and neck during G-force acceleration, and which is easily rotatable to maximize visibility.

Conventional pilot restraint devices, such as lap or upper body straps, restrain the pilot's torso both in flight and during an ejection sequence. However, the pilot's neck and head are free to move forward, in a lateral direction, or rotate in order to achieve desired viewing positions. Also, conventional straps have been found to be inadequate in correctly positioning the pilot in the ejection seat during ejection. The correct position involves the pilot's head, neck, and spine being aligned along the axis of propulsion of the ejection seat from the aircraft. Injuries may occur to the pilot by contact with parts of the aircraft or simply as a result of the high acceleration of the ejection seat as it is propelled from the aircraft. It is therefore desirable to provide a restraining system which both allows freedom of movement of the upper body and head within the cockpit during normal flight and enhances alignment and restraint of the upper body and head of the pilot both in flight and during the ejection sequence.

SUMMARY OF THE INVENTION

The above objects are achieved in the integrated pilot protection and restraint system according to the present invention. The system includes a circular bearing structure configured to surround the wearer's neck, and a helmet which is detachably helmet defines a chamber in which the wearer's head may freely rotate. A means is provided for rotating the helmet in opposite directions on the bearing structure. Control means are further provided for controlling the rotating means to rotate the helmet in response to movements of the wearer's head in order to maintain the helmet in a predetermined position with respect to the wearer's head. According to a further aspect of the invention, a restraining anchor is disposed on a rear portion of the bearing structure at its non-rotating base proximate to the base of the wearer's neck. The restraining anchor is coupled to a retractable restraining device.

BRIEF DESCRIPTION OF THE DRAWINGS

FIGS. 5 and 6 are respective side and top plan views of the helmet rotation and pilot restraining systems in accordance with the present invention; an FIG. 7 is a perspective view of a restraint anchor coupled to the rear base of a disconnect bearing of the present invention.

DETAILED DESCRIPTION OF THE ILLUSTRATED EMBODIMENTS

Figure 1:
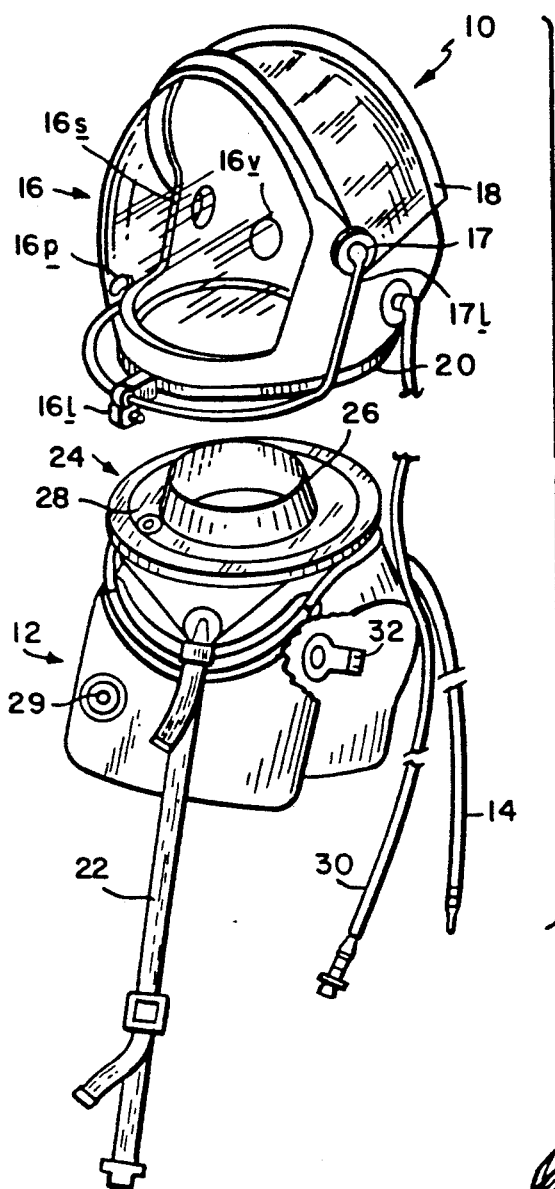
FIG. 1 is a perspective view of a helmet and a vest assembly in accordance with the present invention.

With reference to FIG. 1, a non-conformal full pressure helmet 10 is shown associated with a pressure vest assembly 12. It will be appreciated that the vest assembly may also be configured with a pressure coverall or torso garment. The helmet 10 is non-conformal in that the weight of the helmet is not headborne by the pilot utilizing it, thus G-force acceleration induced head-neck stress and fatigue due to helmet loading is eliminated. Since the helmet is non-conforming to the wearer's head, it need not personalized and assigned to a specific pilot. Rather, the helmet may be utilized in a universal pool of helmets, thus reducing the inventory of helmets required.

The helmet 10 utilizes a standard full pressure oxygen breathing system via oxygen supply hose 14 which, when integrated with the pressure vest 12, provides fully balanced breathing at any pressure. The helmet is also configured to include a large, moveable electrically heated visor 16 which provides a wide field of view. The visor may be constructed from two-ply laminated acrylic/polycarbonate. The large viewing area provides outstanding an effortless visibility in both vertical and horizontal planes. A wire heating grid may be laminated between the two plies of the visor at critical visual areas for defogging under low ambient temperature conditions.

The visor is fitted to the helmet by shrouded pivot mechanisms 17 at the sides. A lever 17*l*, which connects the pivot mechanisms, serves as the visor opening and closing mechanism. The pivot mechanisms are configured with a shroud in order to minimize potential interference with parachute risers. A lip seal 16*s* is integrated with the helmet shell around the visor opening for providing a visor seal requiring minimal sealing force. A bi-lock mechanism 16*l* at the lower center front of the helmet secures the lever 17*l* in the closed position. An independently operated sunshade 18 is affixed externally to the visor and integrated with the pivot mechanisms for providing glare protection. Optional laser or nuclear flash protection visors may be substituted for the sunshade.

In addition, a low profile feeding/drinking port 16*p* may be installed in the lower portion of the visor where it does not interfere with normal visibility. A differential pressure operated anti-suffocation valve 16*v* is disposed in the helmet shell to enable breathing when the normal breathing gas supply is depleted or inadvertently disconnected. An electrical cable assembly 30 provides communications wiring to the helmet and electrical power wiring to the electrically heated visor.

A rotational bushing assembly 20 is provided at the bottom periphery of the helmet. The rotational bushing assembly is configured to be releasably coupled to a disconnect bearing assembly 24 associated with the vest assembly 12. As the helmet is non-conformal to the user's head, under normal circumstances there is no direct mechanical connection or contact between the head and helmet, thus helmet rotation may be accomplished either manually (by hand or nudging by the head) or via an automatic helmet rotation system described hereinafter. Rotation of the helmet accommodates visibility in all directions. The rotational bushing assembly 20 and the disconnect bearing assembly 24 are configured to prevent inadvertent rotation under G-force loading conditions, yet provide ease of manual (override) rotation.

The vest assembly 12, which in effect acts as the platform for the helmet 10 and the disconnect bearing assembly 24, is secured to the pilot's torso with restraint straps 22. The vest assembly fits snugly around the neck and shoulders of the user and includes a neck seal 26 for maintaining a positive breathing pressure within the helmet 10. Additional features of the vest assembly include an exhalation valve 28 integrated with the neck seal 26, a breathing regulator 32 which delivers oxygen to the helmet via the rotational bushing and disconnect bearing assembly, a pressure transfer connector 29 for connecting the vest to an associated torso pressure garment or coverall, and adjustable support springs 31 for providing helmet support and stability. Alternately, the vest assembly 12 may be replaced with an entire torso or coverall pressure garment incorporating the aforementioned features. It will be seen from FIG. 1 that the bearing structure 24 is below the neck seal 26 at a location surrounding the base of the pilot's neck.

Figure 2:
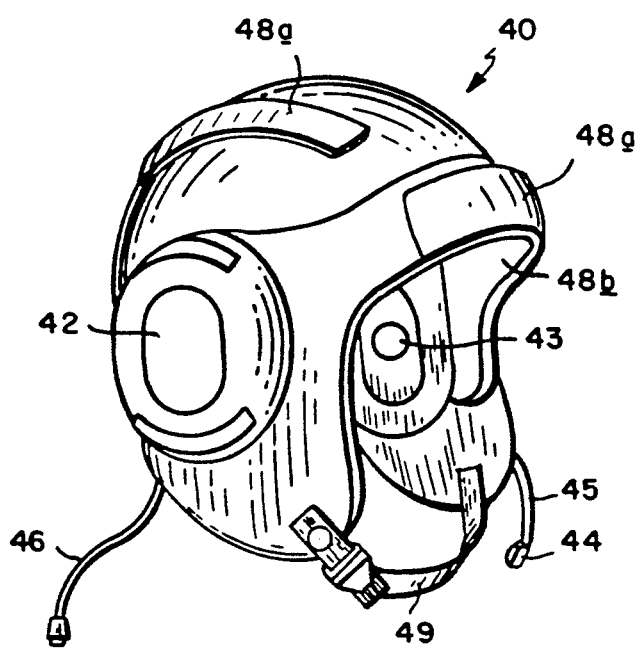
FIG. 2 is a perspective view of a cap-type communications carrier in accordance with the invention.

FIG. 2 shows a lightweight, headborne cap-type communications carrier 40 which conforms to the user's head. The communications carrier is available in various sizes to fit the particular use and is worn in conjunction with the non-conformal helmet 10. Lightweight and low-profile ear cups 42 provide noise attenuation and contain communication receivers 43. In addition, a low-profile microphone 44 and boom assembly 45 are integrated at the frontal portion of the carrier. The receivers and microphone receive communication data via a communications cord 46 which is coupled during use with the communications cable 30.

Since the carrier 40 conforms to the head of the wearer, the carrier also serves as an ideal platform for mounting air crew physiological status monitoring devices (not shown) such as loss of consciousness monitoring systems which require intimate contact with the head. Additionally, 3-D auditory systems may be integrated with the non-conformal helmet 10 and the communications carrier 40, for improved pilot situational awareness. For extremely high noise environments, an optional electronic noise canceling system tailored to and integral with the helmet 10 augments the passive noise attenuation provided by the combination of the helmet and the communications carrier.

Shock attenuating pads 48*a* are integrated with the communications carrier at the top forehead and top side locations to buffer head contact with the inside surface of the helmet 10. An adjustable nape (not shown) and chin strap 49 is provided for size adjustment. Either an under-the-chin strap or a chin cup arrangement may be utilized, depending upon individual preference. A comfort/absorption pad 48*b* integrated across the brow, temple, and upper cheek areas, provides comfort and perspiration absorption under warm operating conditions.

When worn by the pilot, the non-conformal helmet 10 provides a pressure enclosure which has no direct contact with the head of the pilot, thus allowing the wearer's head to freely rotate within the helmet 10. The communications carrier 40 is worn directly on the head of the pilot inside the helmet 10 for communications and buffet protection purposes. Nominal clearance between the communications carrier and the helmet varies depending upon the head size of the user.

Figure 3:
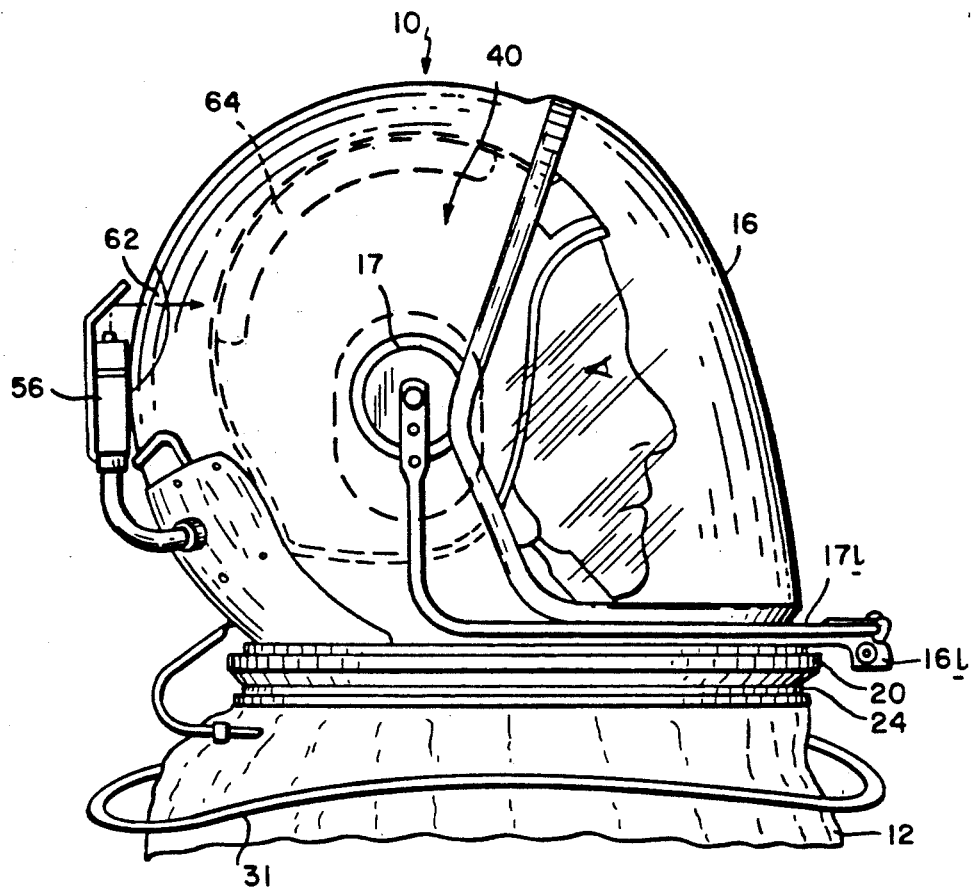
FIG. 3 is a side view of the helmet, communications carrier, and vest assembly as worn by a pilot.
Figure 4:
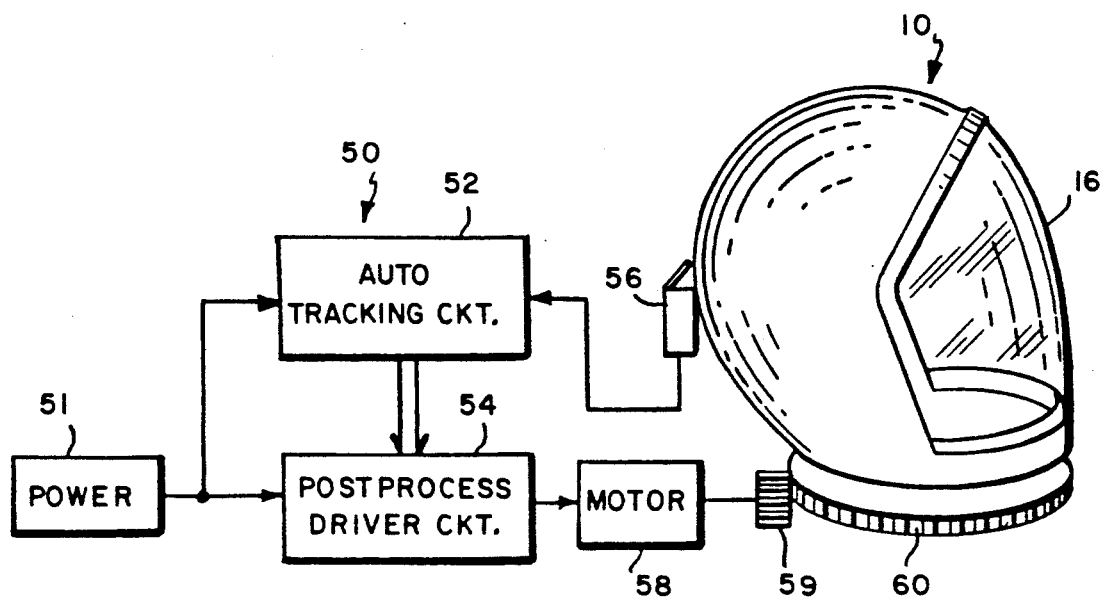
FIG. 4 is a schematic block diagram of the helmet and an automatic helmet rotation system in accordance with the present invention.

Turning now to FIGS. 3 and 4, an automatic helmet rotation system 50 according to the present invention is shown. The automatic helmet rotation system includes automatic tracking circuitry 52, post-process driver circuitry 54, and a power converting source 51, such as those used in automatic video tracking (AVT) systems produced by ISCAN ® of Cambridge, Ma. The AVTs are real-time digital image processors which automatically track the movement of contrasting targets within the field of view of an electro-optic image sensor such as a video camera or a forward-looking infrared imager.

According to an exemplary embodiment of the present invention, a miniature real-time electronic imager 56 is mounted on the rear external portion of the helmet 10. The imager 56 optically tracks the position of a suitably contrasting target 64, such as an LED array or electroluminescent strip which is fixed on the communication carrier 40. The imager 56 tracks the target through an optical viewing port 62 provided at the rear portion of the helmet. The viewing port 62 may be configured to be approximately 5 cm in diameter. As the pilot's head moves within the helmet 10 in relation to the fixed imager 56, an error signal is generated by the imager for processing by the automatic tracking circuitry 52 in order to determine the direction of head movement The automatic tracking circuitry 52 recognizes and tracks the target movement and generates data corresponding to the position of the target within the field of view of the imager 56. The tracking circuitry preferably computes target position at a 60 Hz rate and is not affected by smaller noise or clutter which may be present in the image containing the target.

The post-process driver circuitry 54 operates to receive the data determining the direction of head motion and produces control signals for transmission to a motor 58, which in turn rotates a gear 59 in the direction of the last-detected head motion. The gear 59 meshes with gear segments 60 associated with the bushing assembly 20 for rotating the helmet in the horizontal directions.

The post-process driver circuitry 54 continually adjusts the control signals in order to maintain proper directional rotation of the helmet 10 until subsequent target movement is detected, thus maintaining the helmet in a predetermined position with respect to the wearer's head. A manual override feature may be integrated with the system in order to override the rotation system 50 as described.

All of the system electronics may be powered via a 28 VDC source which is available to the helmet in conventional pilot pressure suit systems. The power source converter 51 operates to transform the 28 VDC to ±12 VDC and 5 VDC necessary for the operation of the imager 56, the automatic tracking circuitry 52, and the post-process driver circuitry 54.

The above-described components are preferably integrated to fit onto the rear portion of the non-conformal helmet 10 such as that (model S1032) manufactured by David Clark Company, Inc., of Worcester, Ma. Custom surface mounted circuitry may be fabricated to meet size and weight specifications. Preferably, the configuration will be such that only approximately two pounds of additional weight will be added to the helmet 10. Furthermore, the imager 56 is preferably provided within an area protruding approximately two inches outward from the helmet rear exterior. The tracking and post process circuitry may be integrated with a custom circuit board assembly designed to fulfill the above design requirements.

The integrated pilot protective system in accordance with the present invention is also configured to restrain the pilot within the cockpit seat 70 in addition to the restraint provided by conventional belt straps 72. With reference to FIGS. 5-7, a restraining anchor 74 is secured to the rear base portion of the disconnect bearing assembly 24 at a location proximate to the base of the pilot's neck. The restraining anchor is releasably coupled to a strap 76 which is part of an inertia operated restraint system (not shown), e.g., shoulder harness inertia wheels, by a quick disconnect coupler 75. The restraining anchor provides excellent helmet and upper body restraint via the retractable strap 76 during high acceleration flight and for ejection. Such upper body and head restraint during the ejection sequence is critical to preventing injury to the pilot. Furthermore, since the restraint anchor 74 is affixed to the disconnect bearing assembly 24 below the rotating bushing 20 of the helmet, there is total freedom of mobility of the helmet and helmet rotation during normal operating conditions.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. An integrated pilot protection and restraint system operable in conjunction with a cockpit seat, said system comprising:
   a garment which envelops at least the upper torso of the pilot's body;
   an annular bearing structure configured to surround the base of the pilot's neck, said bearing structure being integrated with said garment and operable for supporting a helmet;
   a helmet removably coupled to and rotatively carried by said bearing structure;
   a restraining anchor disposed on a rear portion of said bearing structure proximate to the base of the pilot's neck; and
   a retractable restraining device coupled to said restraining anchor, said restraining device being operable under emergency conditions to urge said bearing structure and said garment rearwardly and to thereby provide helmet and upper body support against said cockpit seat.

2. The system of claim 1, wherein said annular bearing structure comprises a helmet rotation portion and non-rotating base portion.

3. The system of claim 2, wherein said restraining anchor is disposed on said rear portion of said annular bearing structure at said non-rotating base portion proximate to the base of the pilot's neck.

4. The system of claim 1, wherein said retractable restraining device comprises a harness and inertial reel assembly.

5. The system of claim 4, wherein said harness is releasably coupled to said restraining anchor.

* * * * *